Figure 1:
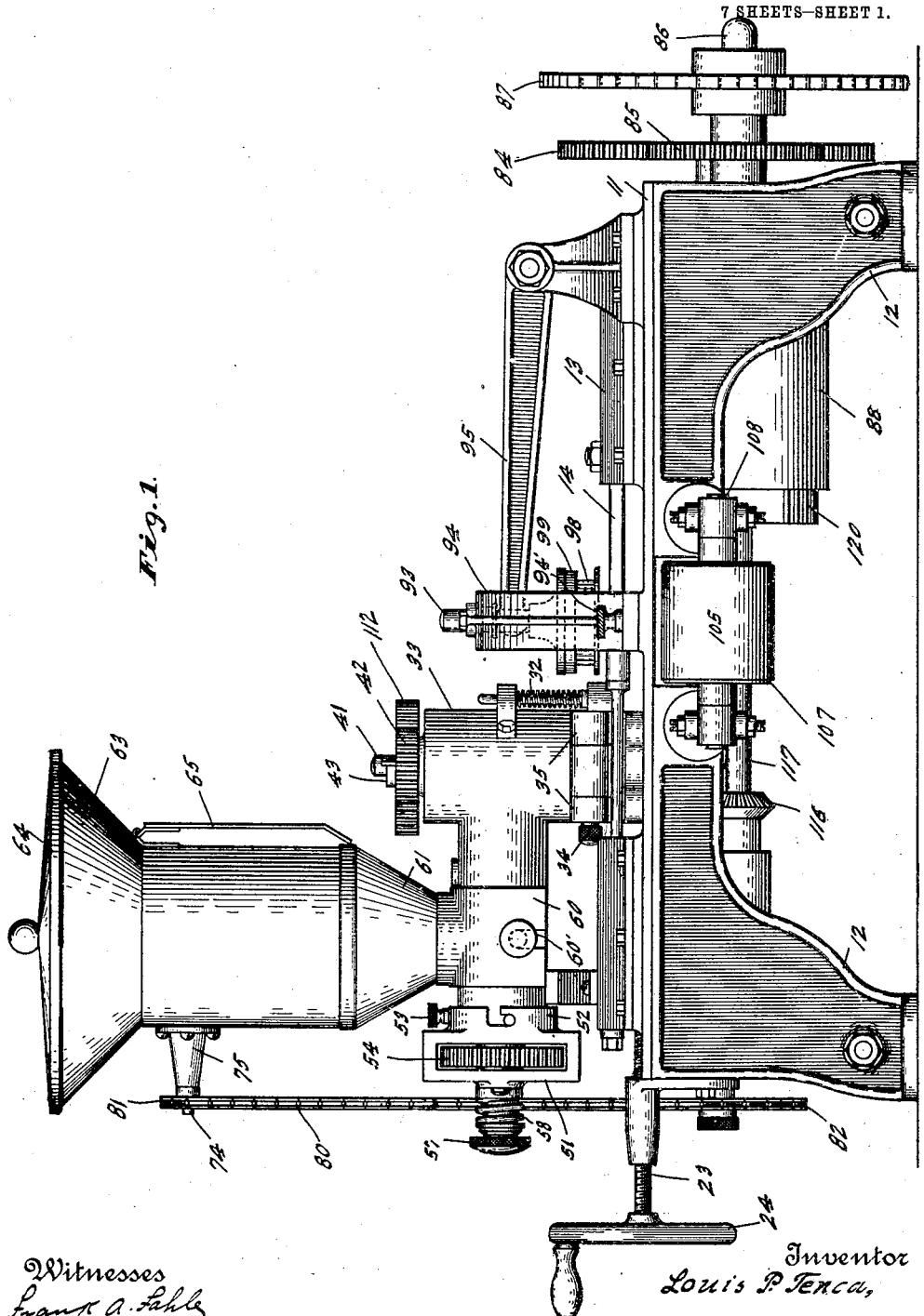

L. P. TENCA.
TABLET MAKING MACHINE.
APPLICATION FILED MAR. 9, 1912.

1,100,928.

Patented June 23, 1914.

7 SHEETS—SHEET 1.

Witnesses
Frank A. Fahle
May Layden

Inventor
Louis P. Tenca,
by Arthur M. Hood
Attorney

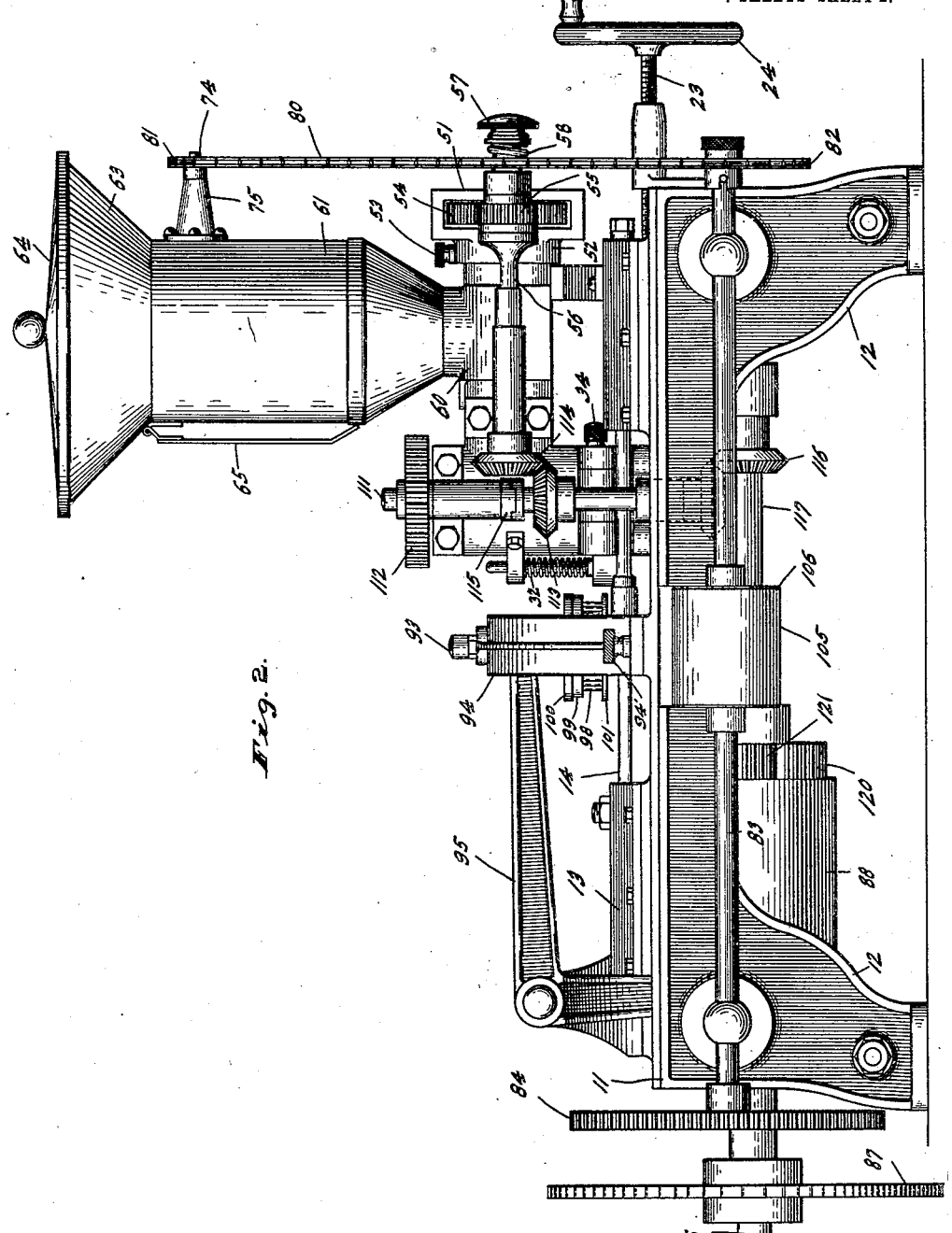

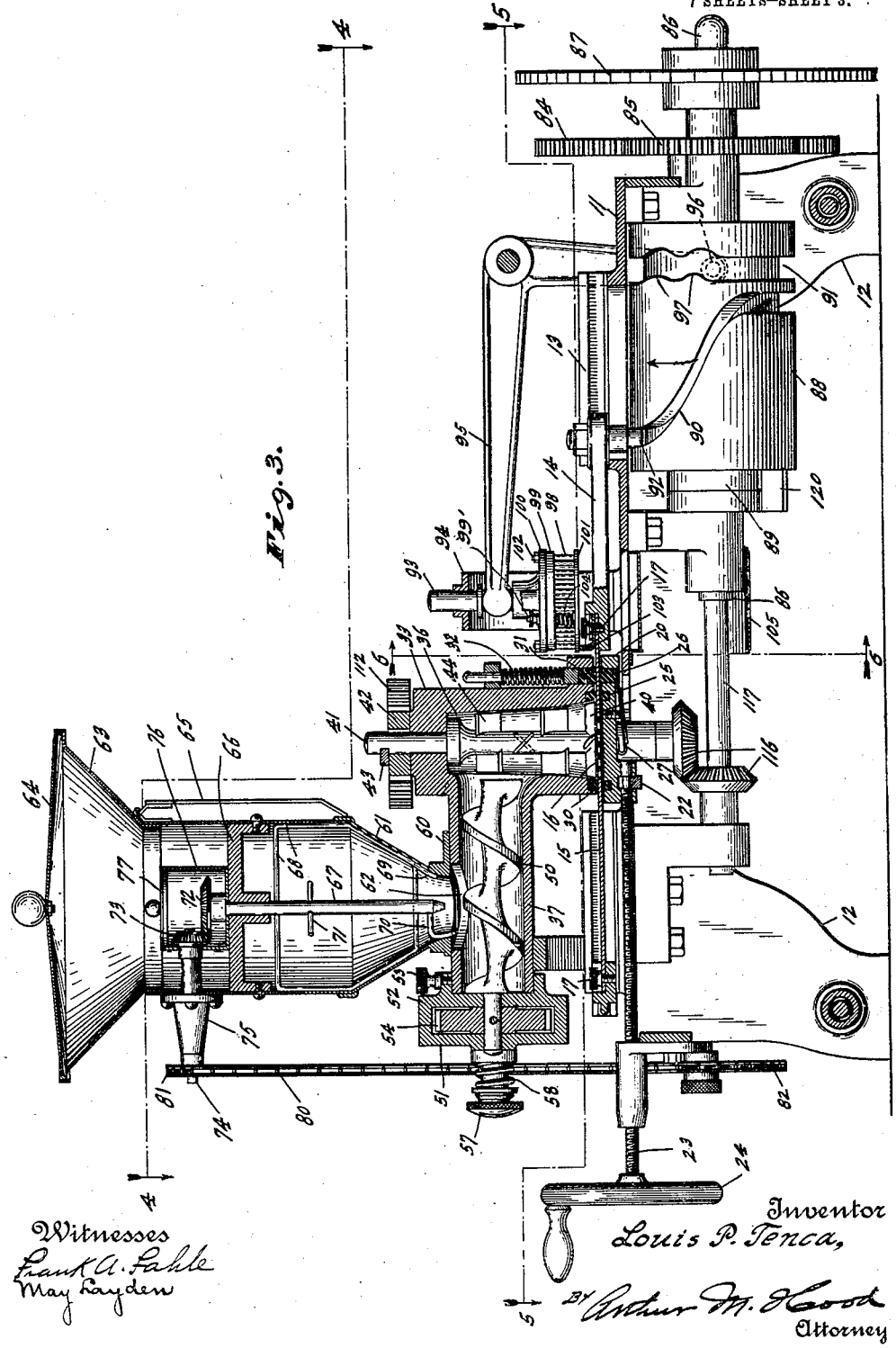

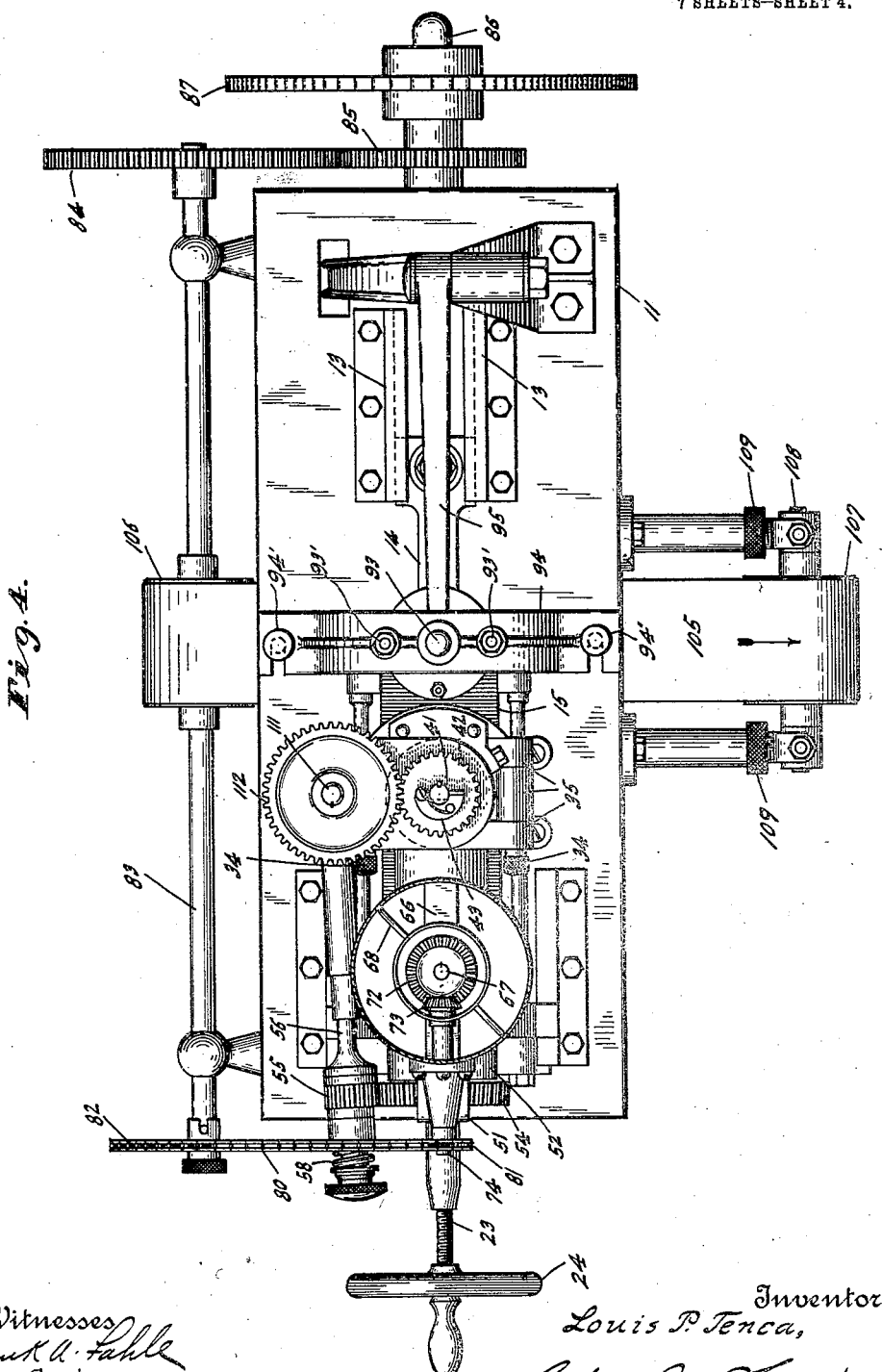

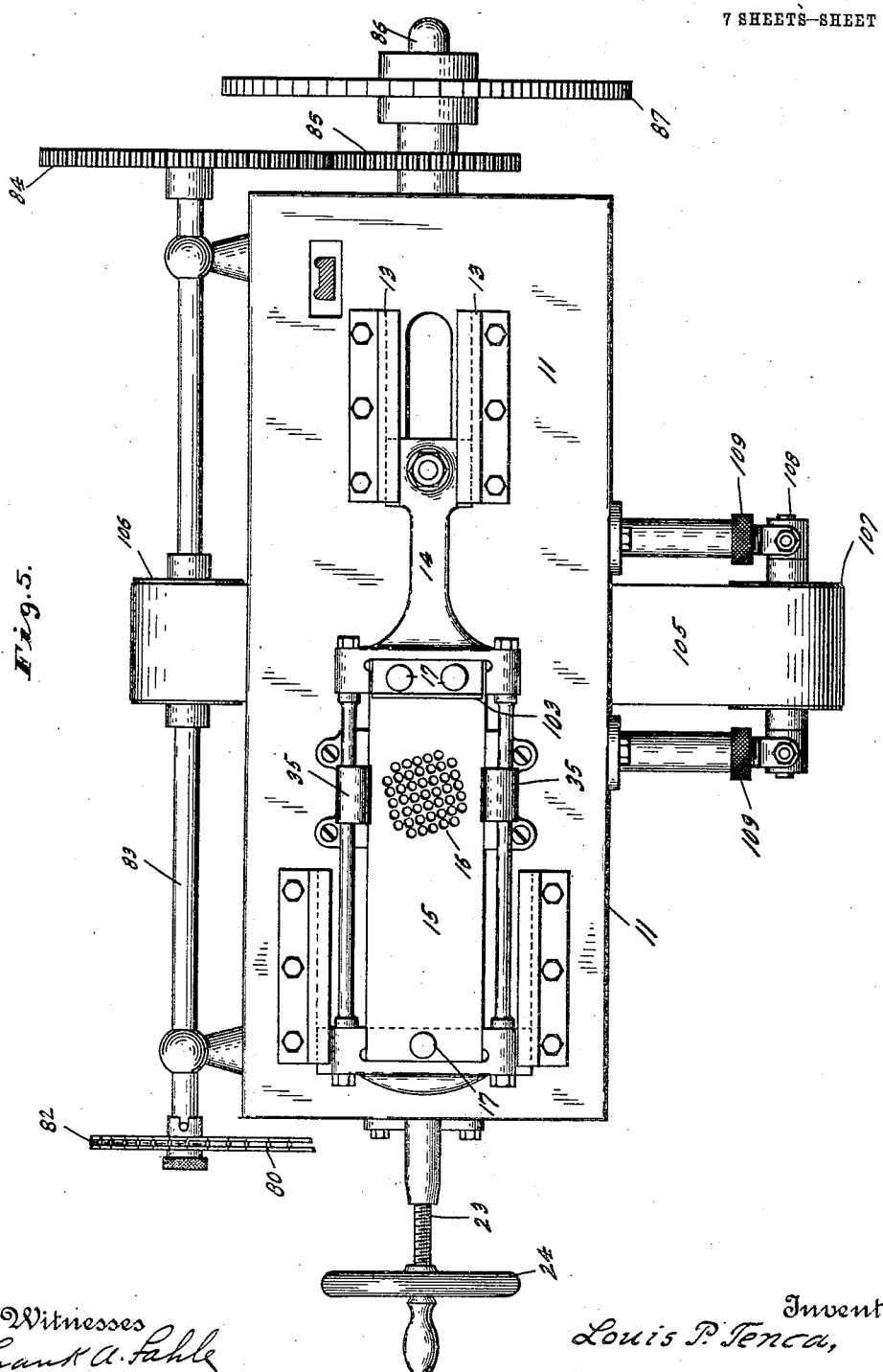

L. P. TENCA.
TABLET MAKING MACHINE.
APPLICATION FILED MAR. 9, 1912.
1,100,928.
Patented June 23, 1914.
7 SHEETS—SHEET 6.
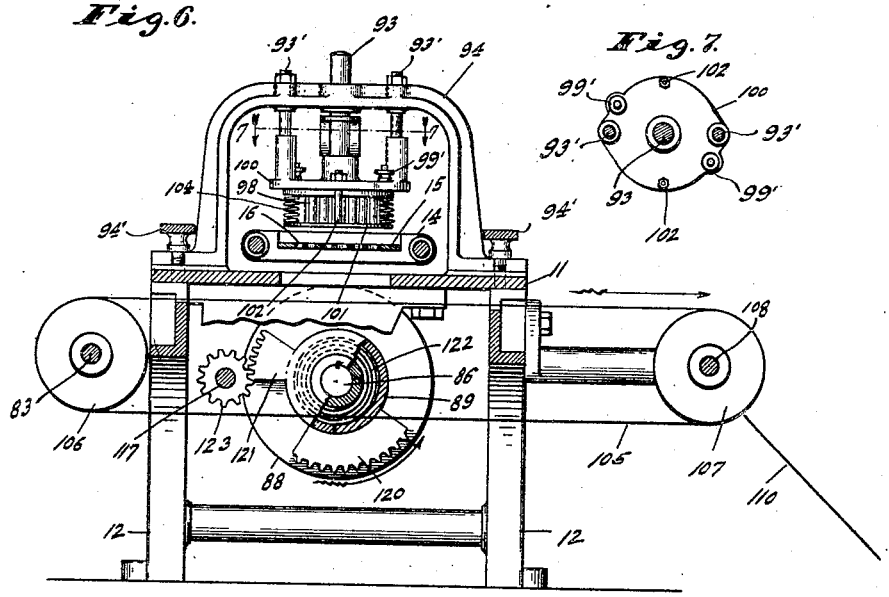
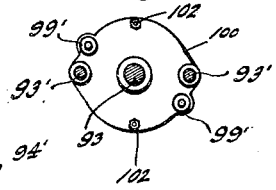
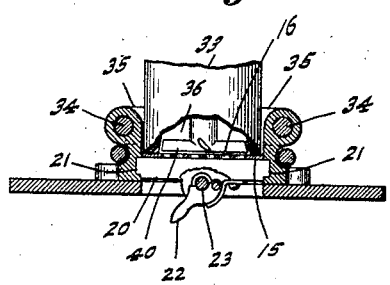
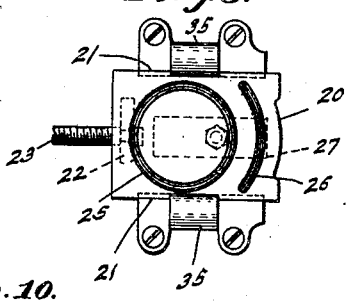
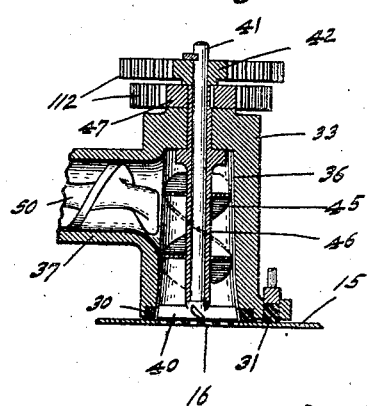
Witnesses
Frank A. Fahle
May Layden
Inventor
Louis P. Tenca,
by Arthur M. Hood
Attorney

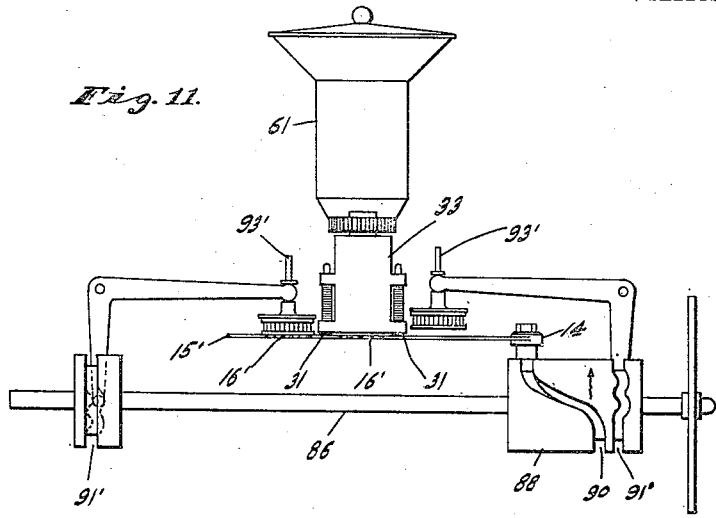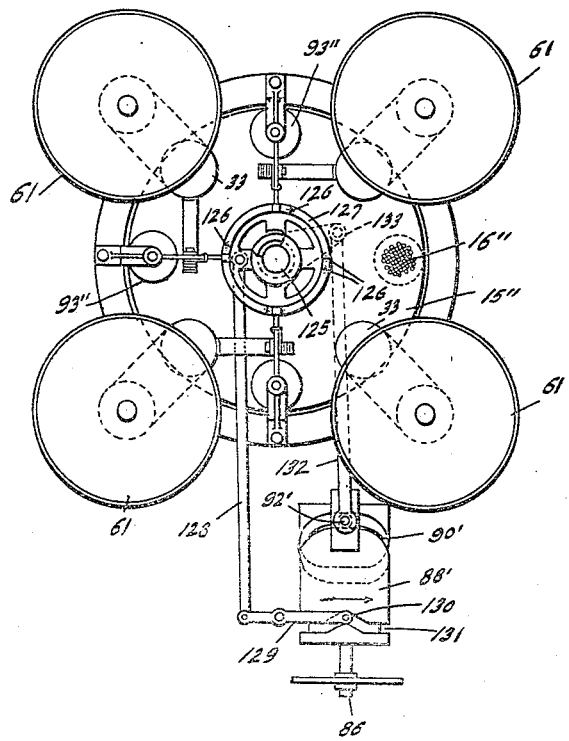

UNITED STATES PATENT OFFICE.

LOUIS P. TENCA, OF INDIANAPOLIS, INDIANA, ASSIGNOR TO THE ELI LILLY & COMPANY, OF INDIANAPOLIS, INDIANA, A CORPORATION OF INDIANA.

TABLET-MAKING MACHINE.

1,100,928.       Specification of Letters Patent.       Patented June 23, 1914.

Application filed March 9, 1912. Serial No. 682,816.

*To all whom it may concern:*

Be it known that I, LOUIS P. TENCA, a subject of the King of Italy, residing at Indianapolis, in the county of Marion and State of Indiana, have invented a new and useful Tablet-Making Machine, of which the following is a specification.

In the making of medicinal tablets it is necessary that the greatest degree of care and accuracy be used, as either contamination or inaccuracy may cost dearly in human life. Each tablet must be exactly of the proper size and must be compressed exactly to the required degree and not beyond it. This last feature is especially necessary in tablets which are to be used for forming solutions, as for hypodermic use. If the tablet is too greatly compressed it becomes less readily soluble, and may be so slowly soluble as to be unsatisfactory for use.

Heretofore it has generally been found expedient to make such medicinal tablets by hand. This has been done by forcing the prepared material, which is in powdered form and usually consists of a body of sugar of milk in which is thoroughly mixed a small amount of alcohol and the required proportion of the desired chemical, by a hand spatula into holes of proper size in a plate of proper thickness, the plate at this time lying on a smooth surface, and then putting the plate in a suitable frame and pushing the formed tablets therefrom by one or more blows, two usually being required, manually given on a plunger carrying pins arranged to project into the several holes in the plate. This is a comparatively slow process, even with skilled operators.

It is the object of my invention to provide a machine capable of making medicinal tablets which meet all requirements fully as well as, or even better than, those made by hand. In attaining this object, I have produced a machine which in many respects closely copies the actions used in the hand manufacture, but is able to do the work of many operatives.

The various novel features of my invention will appear from the description and drawings, and will be particularly pointed out in the claims.

In the drawings, Figure 1 is a front elevation of a tablet-making machine embodying one form of my invention; Fig. 2 is a rear elevation of the same machine; Fig. 3 is a vertical longitudinal section through the same machine; Fig. 4 is a section on the line 4—4 of Fig. 3; Fig. 5 is a section on the line 5—5 of Fig. 3; Fig. 6 is a section on the line 6—6 of Fig. 3; Fig. 7 is a section on the line 7—7 of Fig. 6; Fig. 8 is a transverse vertical sectional view through the tablet plate and associated parts; Fig. 9 is a detail plan view of the base plate and its mounting; Fig. 10 is a detail of a modification of the mechanism for feeding the tablet plate; and Figs. 11 and 12 illustrate semidiagrammatically modified forms of my invention.

The main frame 11, supported on legs 12, carries all the apparatus, the parts which operate on the tablet material all being readily removable for cleaning. Movable in guides 13 longitudinally of the main frame 11 is the tablet plate frame 14, in which the tablet plate 15 is removably mounted by thumb screws 17. The tablet plate 15, the thickness of which is the desired thickness of the finished tablets, is provided near one end with a group of holes 16 of proper size for the desired tablets.

The tablet plate 15 is located between a base plate 20 on the bottom and the feeding mechanism on the top. The base plate 20 is preferably of hard metal, such as steel, located very close to the tablet plate and mounted in guide-ways 21, and is prevented from moving with said tablet plate frame by being releasably fastened, by a spring finger 22, to the end of an adjusting screw 23, operable by a hand wheel 24 at one end of the frame 11. Set in the upper face of the base plate 20 is a ring 25, preferably made of hard rubber, which ring surrounds the group of holes 16 when the latter are in position to be supplied with tablet material. This ring is of sufficient thickness so that it engages the bottom of the plate 15 firmly, and serves to remove any tablet material which may project beyond the lower ends of the holes 16. An arc-shaped segment 26, also preferably of hard rubber, is mounted in the plate 20 outside the ring 25 in the direction in which the tablet plate 15 moves after being loaded, and is pressed upwardly into engagement with the bottom of the plate 15 by an adjustable leaf spring 27. The segment 26 supplements the action of the ring 25 in removing any downwardly projecting parts of the tablets, and also polishes the lower faces of the tablets.

A ring 30 and a segment 31 operate on the top surface of plate 15 in the same manner as the ring 25 and segment 26 on the lower face thereof, and are preferably located directly above the ring 25 and segment 26 when the base plate 20 is properly adjusted. The segment 31 is pressed downwardly against the upper face of the plate 15 by means of coil springs 32. The ring 30 and segment 31 are mounted in the lower face of the feeder frame 33, which is held in place on the main frame 11 by removable pins 34 passing through coöperating ears 35 on said two frames. The feeder frame 33 has a vertical passageway 36 and a horizontal passageway 37, the former of which feeds into the ring 30.

A multi-bladed spatula 40 is mounted on the lower end of a vertical shaft 41 extending centrally through the passage 36 and provided at its upper end with a removable gear 42 held in place by the spring finger 43, the removal of the gear 42 by the release of the finger 43 allowing the removal of the shaft 41 from the passage 36. The tablet material is suitably forced down through the passage 36, as by drifts 44 as shown in Fig. 3, or by a worm 45 as shown in Fig. 10. If the drifts are used, they are preferably mounted on the shaft 41, while if the worm is used, it is preferably mounted on a sleeve 46 surrounding the shaft 41 and provided at its upper end with a gear 47 removable after the removal of the gear 42. The gears 42 and 47 are driven from the same source of power, and are preferably of such size relatively to each other that the worm 45 is driven faster than is the spatula 40.

In the chamber 37 there is a worm 50, which is preferably mounted at one end in bearings 51 formed in a cap 52 removably held in place, as by one or more thumb screws 53, over that end of the passage 37 which is opposite the passage 36. Fixed on the shaft of the worm 50 between the bearings 51 is a gear 54, which meshes with a gear 55 frictionally held on a shaft 56 by a thumb screw 57 and spring 58.

A saddle 60, removably held in place by thumb screws 60', fits over the horizontal part of the feeder frame 33, and carries a hopper 61 for the tablet material. The bottom of this hopper opens through the saddle 60 and a hole 62 in the top of the chamber 37, to supply the latter with tablet material. At the top of the hopper 60 is a removable funnel 63, covered by a removable lid 64. The hopper may also have a hinged cover 65 for covering it when the funnel 63 is not in place. A bridge 66 within the hopper 61 furnishes a bearing for a vertical shaft 67, which is provided with a wire scraper 68 fitting fairly closely to the inside of the hopper and having a finger 69 projecting down well into the opening through the saddle 60 to prevent the tablet material from sticking therein. The shaft 67 may carry another finger 70 which also projects into and through such opening near its edge to assist the finger 69 and to stir the tablet material within such opening. There may also be one or more stirrers or cross wires 71 mounted in the shaft 67 to keep the material within the hopper 61 moving. At the upper end of the shaft 67 is a bevel gear 72 meshing with a bevel gear 73 on a horizontal shaft 74 mounted in a sleeve bearing 75 fixed to the side of the hopper 61 and extending inward to the gear 73 to completely cover the shaft 74. The gears 72 and 73 are located in a case 76 provided with a removable cap 77, the case 76 and its cap completely covering the gears and with the sleeve bearing 75 preventing the tablet material from coming in contact with the shaft 74 or either of said gears. The shaft 74 is driven, as by a chain 80 and suitable sprockets 81 and 82, from a continuously moving countershaft 83, the sprocket 82 being removably fixed on the countershaft.

The countershaft 83 is driven by gears 84 and 85 from the main shaft 86, mounted in suitable bearings below the bed 11 of the main frame and receiving power from any suitable source, as through a sprocket wheel 87. The shaft 86 is also provided with a cylindrical cam 88 and an intermittent gear 89. The cam 88 has two cam grooves 90 and 91 in its cylindrical surface. The cam groove 90 receives a pin 92 projecting downwardly from the tablet plate frame 14, so that the rotation of the shaft 86 and cam 88 reciprocates said frame in the guides 13. The groove 90 has inclined portions and straight portions, the inclined portions reciprocating the frame 14 and the straight portions permitting a period of rest at the end of each movement. The two periods of rest are for the filling of the holes 16 in the tablet plate frame 14 by the spatula 40 and for the removal of the formed tablets from the plate. The removal is obtained by a plunger 93 mounted for vertical movement in a support and guide 94, removably held in place by thumb screws 94' passing through slots in the feet of said guide. The plunger 93, the movement of which is guided by guide rods 93', is operated by one arm of a bell-crank lever 95, the other arm of which carries a pin 96 which extends into the second cam groove 91 in the cam 88.

This cam groove 91 has two offsets 97 which coöperate with the pin 96 to move the plunger 93 downward twice while the tablet plate frame 14 is in its discharge position of rest.

The plunger 93 comprises a plurality of pins 98 arranged exactly as are the holes 16 and of suitable size to penetrate such holes, these pins being fixed in a plate 99 adjustably fastened by thumb screws 99' to a plate 100 fixed on the base of the plunger rod, the shanks of such thumb screws passing through holes in the plate 100 slightly larger than are such shanks. By this adjustment the pins 98 may be made to register exactly with the holes 16. The lower ends of the pins 98 are guided by a stripper plate 101, suspended from the plate 100 by adjustable screws 102, which allow its upward movement relatively to the plate 100, and pushed downward by springs 104. Normally the lower ends of the pins 98 are slightly higher than the lower face of the plate 101, so that such plate prevents the pins from sticking to the top of the tablets. The lower face of the stripper plate 101 is kept clean by a leather wiper 103 carried by the tablet plate frame 14.

The tablets which are forced downwardly from the holes 16 in the plate 15 drop upon a belt conveyer 105 extending transversely to the main frame 11 and carried by a roller 106 on the countershaft 83 and a roller 107 on a countershaft 108, which latter may be adjustable by screws 109 toward and from the main frame 11, thus permitting the tension of the belt conveyer to be adjusted. The belt conveyer 105 travels in the direction of the arrow, and discharges to a chute 110 which carries the tablets to any desired point.

The spatula 40, the drifts 44, the worm 45, and the worm 50 are driven intermittently, operating only when the holes 16 are partly or wholly in position to receive material from the passage 36. If this were not so, the continuous operation of the spatula 40 on the tablet material without the possibility of forcing the latter into holes in the plate 15 would cause a certain friction, which would tend to melt part of the sugar of milk in such material and to compress the remainder, thus by the solidification of the melted part and its consequent binding of the compressed remainder tending to form a cake above the plate 15. This caking is entirely prevented by the intermittent operation of the parts mentioned. To obtain this intermittent operation, the shafts 41 and 56, and the sleeve 46 if used, are driven from the vertical countershaft 111, which is provided with one or more gears 112 for meshing engagement with the gear 42 or the gears 42 and 47, and with a bevel gear 113 for engagement with a bevel gear 114 on the shaft 56. The shaft 111 is made in two parts, joined by a coupling 115, the lower part being journaled in the main frame 11 and the upper part in a bearing provided on the feeder frame 33. Thus the upper part of this shaft and the gear 112 carried thereby are removable with such feeder frame. The shaft 111 is driven by the bevel gear 116 from the countershaft 117, which in turn is driven from the main shaft 86 by the intermittent gear 89. This intermittent gear may take a variety of forms, the form shown in Fig. 6 being now preferred. In this form a gear segment 120 is fixed on the shaft 86, and a second gear segment 121 loosely mounted on said shaft is connected to the gear segment 120 by a spiral spring 122 which tends to move the loose gear segment 121 in counter-clockwise direction, (Fig. 6.) This spring is strong enough to move the gear segment 121 itself, but is not strong enough to drive the pinion 123 on the shaft 117, with which pinion said gear segments coöperate. As a result, the shaft 117 and the parts driven thereby remain at rest save when the pinion 123 is in engagement with the segment 120, or is in engagement with the segment 121 and the latter is engaged by and being pushed by the segment 120. The gear segment 120 is so fixed on the shaft 86 that its forward edge engages the rear edge of the gear segment 121 when the holes 16 lie under the vertical passage 36, thus causing the operation of the spatula 40, the drifts 44 or the worm 45, and the worm 50 at such time; and so that its rear tooth passes out of engagement with the pinion 123 as the plate 15 starts to move from loading position to discharging position.

In operation, the prepared tablet material, made of sugar of milk or other suitable material containing the desired proportion of the active chemical and mixed with sufficient alcohol or other moistening agent to form a damp powder, is put into the hopper 61 through the funnel 63, the latter being then covered with the cap 64. Power now being supplied to the shaft 86, the shaft 67 is rotated and the parts carried thereby cause the tablet material to fall through the hole 62 into the chamber 37. Here the worm 50 intermittently forces such material toward and into the chamber 36, where it descends by the action of gravity, assisted at times by the drifts 44 or the worm 45, to the spatula 40. When the tablet plate 15 is in the position shown in Fig. 3, the spatula 40 is operating and forces the tablet material into the holes 16. When these holes are filled, the intermittent gear 89 ceases to operate the parts within the feeder frame 33 and the cam groove 90 begins to move the tablet plate frame 14 and tablet plate 15 from loading to discharging position. In this movement, the tops and bottoms of the tablets are smoothed off and any excess removed by the rings 25 and 30 and the segments 26 and 31. When the cam groove 90 has brought the parts to rest in discharging position, the offsets 97 in the cam groove 91 operate the bell crank lever 95 to force the plunger 93 downwardly twice while the plate 15 remains stationary. The plunger moves in its entirety until the stripper plate 101 strikes the upper face of the tablet plate 15, whereupon such stripper plate stops and the pins 98 continue their downward movement into and through the holes 16, the springs 114 being compressed while the plate 101 remains stationary. After having gone through the holes 16, the pins 98 move upward from such holes, the plate 101 preventing the tablets from sticking to the bottoms of such pins, and then the plunger moves upward in its entirety to its normal position. This movement is repeated, because it is found, in the hand manufacture of tablets as well as in the manufacture by my machine, that on the first descent of the plunger some of the tablets may stick to the pins and be drawn back into the tablet plate, but a second descent of the plunger insures removal of all the tablets from the holes 16. After the second movement has been completed, the reversely inclined part of the cam groove 90 begins to move the tablet plate frame 14 and tablet plate 15 from discharging position to loading position, the intermittent gear beginning to operate the parts within the feeder frame 33 as soon as the holes 16 are in position to receive tablet material from the passage 36. The loading and discharging operation is then repeated, making a complete operation for each revolution of the shaft 86. The very thin space between the plate 15 and the base plate 20 within the ring 25 is soon filled with tablet material, which cakes there and forms a hard floor over which the plate 15 slides. The compression of the tablets is controlled by the thumb screw 57 of the friction clutch on the shaft 56, this clutch slipping when the back pressure on the worm 50 reaches a predetermined point.

The output of the machine may be increased by providing the tablet plate with a plurality of groups of holes, and discharging the formed tablets from one group of holes while another group of holes is being loaded. Two such arrangements are shown semi-diagrammatically in Figs. 11 and 12, respectively. In the arrangement shown in Fig. 11, the tablet plate 15' is made to reciprocate transversely to the axis of the horizontal passageway of the feeder frame 33, so that in the figure the hopper 61 appears to be directly above the vertical passageway in said feeder frame. The plate 15' has two groups of holes 16', which may be similar or dissimilar to produce tablets of the same or different sizes. The plate 15' is reciprocated by the cam slot 90 in the cam 88, one group of holes 16' being under the passageway 37 to receive the tablet material while the other group of holes is to the right or to the left of such passageway in position to be discharged by the operation of one of the two plungers 93', which are operated alternately by the two cam grooves 91'. In this arrangement, there are two sets of tablet-polishing segments, such as 31.

In the arrangement shown in Fig. 12, the plate 15" is of circular form, rotatable about a shaft 125. This plate 15" is provided with an annular series of groups of holes 16", and half as many hoppers 61 and feeder frames 33. One set of alternate groups of holes 16" is being loaded by the various feeder frames 33 while the other set of alternate groups of holes is being discharged, at points between adjacent feeder frames, by means of the four plungers 93". The plungers 93" are operated by cams 126 on the cam ring 127 rotatable about the shaft 125, this rotation being either continuous in the same direction or alternately in opposite directions. As shown, it is alternately in opposite directions, being obtained by means of a connecting rod 128 and a lever 129 carrying a pin 130 extending into a cam groove 131 in the cam 88' on the main shaft 86. The movement of the tablet plate 15" may also be either always in the same direction or alternately in opposite directions. If always in the same direction, each group of holes 16" coöperates in turn with each feeder frame 33, and is discharged at intermediate points between such frames by the respective plungers 93". In this case the groups of holes 16" are all alike, and make tablets of the same size. If the motion of the plate 15" is reciprocatory, the two groups of holes 16" which are alternately discharged by the same plunger 93" are of the same size, which may be different from those of the groups of holes which are discharged by the other plungers. Thus in the arrangement shown tablets of four sizes may be made at the same time. The reciprocation of the plate 15" may be obtained by a cam groove 90' in the cam 88', which cam groove coöperates with a pin 92' and a link 132 connected to a crank arm 133 on the plate 15".

My invention is capable of many other modifications, and I aim to cover all modifications which come within the spirit and scope of my invention as set forth in the following claims:

What I claim as new is:

1. A medicinal tablet-making machine, comprising a plate provided with a hole or group of holes, means for forcing tablet material toward said plate, said plate being movable relatively to said means, and driving means, including a friction clutch which slips upon a predeterminable back pressure, for operating said first named means.

2. A medicinal tablet-making machine, comprising a plate provided with a hole or group of holes, means for forcing tablet material toward said plate, said plate being movable relatively to said means, and driving means, including a friction clutch which slips upon a predeterminable back pressure, for operating said first named means only when the hole or holes in the latter plate are in position to receive tablet material.

3. A medicinal tablet-making machine, comprising a plate provided with a hole or group of holes, means for reciprocating said plate and for allowing it to rest in each extreme position, feeder mechanism comprising means for forcing tablet material toward said plate, means for supplying tablet material to said feeder mechanism, means for operating said feeder mechanism only when the hole or holes in the plate are in position to receive material therefrom, and means for operating said supplying means for the feeder mechanism, said last-named means including a friction clutch which allows slipping at a predetermined back pressure.

4. A medicinal tablet-making machine, comprising a plate provided with a hole or group of holes, means for reciprocating said plate, feeder mechanism comprising means for forcing tablet material toward said plate, means for supplying tablet material to said feeder mechanism, means for operating said feeder mechanism only when the hole or holes in the plate are in position to receive material therefrom, and means for operating said supplying means for the feeder mechanism, said last-named means including a friction clutch which allows slipping at a predetermined back pressure.

5. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said discharge mechanism comprising a plunger movable transversely to the tablet plate and provided with a pin which extends into each hole in the plate upon the movement of the plunger, a stripper plate spring-mounted on the plunger and provided with a hole for each pin of the plunger, the face of the stripper plate toward the tablet plate normally being closer thereto than are the ends of the pin or pins, and means for reciprocating said plunger a plurality of times at each discharge period of rest of the tablet plate, said feeder mechanism comprising a rotatable spatula close to the tablet plate, means for supplying tablet material to said spatula, and means for operating the feeder mechanism only when the hole or holes in the tablet plate are in position to receive material from the spatula.

6. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said discharge mechanism comprising a plunger movable transversely to the tablet plate and provided with a pin which extends into each hole in the plate upon the movement of the plunger, a stripper plate spring-mounted on the plunger and provided with a hole for each pin of the plunger, the face of the stripper plate toward the tablet plate normally being closer thereto than are the ends of the pin or pins, and means for reciprocating said plunger a plurality of times at each discharge of rest of the tablet plate.

7. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said discharge mechanism comprising a plunger movable transversely to the tablet plate and provided with a pin which extends into each hole in the plate upon the movement of the plunger, a stripper plate spring-mounted on the plunger and provided with a hole for each pin of the plunger, the face of the stripper plate toward the tablet plate normally being closer thereto than are the ends of the pin or pins, and means for reciprocating said plunger at each discharge period of rest of the tablet plate.

8. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said discharge mechanism comprising a plunger movable transversely to the tablet plate and provided with a pin which extends into each hole in the plate upon the movement of the plunger, and means for reciprocating said plunger a plurality of times at each discharge period of rest of the tablet plate.

9. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said discharge mechanism comprising a plunger movable transversely to the tablet plate and provided with a pin which extends into each hole in the plate upon the movement of the plunger, a stripper plate spring-mounted on the plunger and provided with a hole for each pin of the plunger, the face of the stripper plate toward the tablet plate normally being closer thereto than are the ends of the pin or pins, means for reciprocating said plunger at each discharge period of rest of the tablet plate, and a wiper carried by the tablet plate for cleaning that face of the stripper plate which is toward said tablet plate.

10. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said feeder mechanism comprising a rotatable spatula close to the tablet plate, means for supplying tablet material to said spatula, means for operating the spatula only when the hole or holes in the tablet plate are in position to receive material from the spatula, a worm for supplying tablet material to said spatula-supplying means, and an adjustable friction clutch in the driving connection for said worm.

11. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said feeder mechanism comprising a rotatable spatula close to the tablet plate, means for supplying tablet material to said spatula, means for operating the spatula only when the hole or holes in the tablet plate are in position to receive material from the spatula, a worm for supplying tablet material to said spatula-supplying means, and a friction clutch in the driving connection for said worm.

12. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said feeder mechanism comprising a rotatable spatula close to the tablet plate, means for supplying tablet material to said spatula, means for operating the spatula only when the hole or holes in the tablet plate are in position to receive material from the spatula, a worm for supplying tablet material to said spatula-supplying means, and a friction clutch in the driving connection for said worm, said worm being driven from the intermittent driving means which drives the spatula.

13. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said feeder mechanism comprising a rotatable spatula close to the tablet plate, means for supplying tablet material to said spatula, means for operating the feeder mechanism only when the hole or holes in the tablet plate are in position to receive material from the spatula, a hopper for supplying the feeding mechanism, and means rotatable within the hopper for stirring the material therein, said last-named means including an eccentric finger projecting into the opening between the hopper and the feeding mechanism.

14. A medicinal tablet-making machine, comprising a tablet plate provided with a hole or group of holes, means for intermittently moving said tablet plate, feeder mechanism which feeds material to said holes during alternate periods of rest of the tablet plate, and discharge mechanism which discharges the tablet or tablets from said hole or holes during the other alternate periods of rest of the tablet plate, said feeder mechanism comprising a rotatable spatula close to the tablet plate, means for supplying tablet material to said spatula, means for operating the feeder mechanism only when the hole or holes in the tablet plate are in position to receive material from the spatula, a hopper for supplying the feeding mechanism, and means rotatable within the hopper for stirring the material therein, said hopper being removably mounted on said feeder mechanism.

15. A medicinal tablet-making machine, comprising a tablet plate provided with a hole or group of holes, means for intermittently moving said tablet plate, feeding mechanism covering said hole or holes when the tablet plate is in one position of rest, said feeding mechanism comprising means for forcing tablet material into said hole or holes, a base plate on the opposite side of said tablet plate from said feeding mechanism, and rings carried by said feeding mechanism and said base plate and bearing against opposite sides of said plate and surrounding said hole or holes when the tablet plate is in position to receive material from the feeding mechanism.

16. A medicinal tablet-making machine, comprising a tablet plate provided with a hole or group of holes, means for intermittently moving said tablet plate, feeding mechanism covering said hole or holes when the tablet plate is in one position of rest, said feeding mechanism comprising means for forcing tablet material into said hole or holes, a base plate on the opposite side of said tablet plate from said feeding mechanism, and spring pressed polishing members carried by said feeding mechanism and said base plate and bearing on opposite sides of the tablet plate at a place where the hole or holes in the tablet plate must pass between them in the movement of the tablet plate after the hole or holes have been filled by the feeding mechanism.

17. In a medicinal tablet-making machine comprising a tablet plate provided with a hole or group of holes, means for intermittently moving said tablet plate, feeding mechanism covering said hole or holes when the tablet plate is in one position of rest, said feeding mechanism comprising means for forcing tablet material into said hole or holes, a base plate on the opposite side of said tablet plate from said feeding mechanism, said base plate being spaced slightly from the tablet plate to allow the formation of a bed of the tablet material between the tablet plate and the base plate and being provided with means for maintaining in proper position the bed thus formed.

18. A medicinal tablet-making machine comprising a tablet plate provided with a hole or group of holes, means for intermittently moving said tablet plate, feeding mechanism covering said hole or holes when the tablet plate is in one position of rest, said feeding mechanism comprising means for forcing tablet material into said hole or holes, a base plate on the opposite side of said tablet plate from said feeding mechanism, said base plate being spaced slightly from the tablet plate to allow the formation of a bed of the tablet material between the tablet plate and the base plate and being provided with a ring surrounding said bed and projecting from the face of the base plate toward the tablet plate.

19. A medicinal tablet-making machine comprising a tablet plate provided with a hole or group of holes, feeding mechanism relatively to which said tablet plate is movable, said feeding mechanism covering said hole or holes and comprising means for forcing tablet material into them at points in such relative movement, a base plate on the opposite side of said tablet plate from said feeding mechanism, said base plate being spaced slightly from the tablet plate to allow the formation of a bed of the tablet material between the tablet plate and the base plate and being provided with means for maintaining in proper position the bed thus formed.

20. A medicinal tablet-making machine, comprising a tablet plate provided with a hole or group of holes, means for filling said holes with tablet material to form tablets, and discharge mechanism for discharging the tablet or tablets from said hole or holes, said discharge mechanism comprising a plunger movable transversely to the tablet plate and provided with a pin which extends into each hole in the plate upon the transverse movement of the plunger, a stripper plate spring-mounted on the plunger and provided with a hole for each pin of the plunger, the face of the stripper plate which is toward the tablet plate normally being closer thereto than are the ends of the pin or pins, and a wiper carried by the tablet plate for cleaning that face of the stripper plate which is toward said tablet plate.

21. A medicinal tablet-making machine, comprising a tablet plate provided with a hole or group of holes, means for filling said holes with tablet material to form tablets, and discharge mechanism for discharging the tablet or tablets from said hole or holes, said discharge mechanism comprising a plunger movable transversely to the tablet plate and provided with a pin which extends into each hole in the plate upon the transverse movement of the plunger and a stripper plate spring-mounted on the plunger and provided with a hole for each pin of the plunger, the face of the stripper plate which is toward the tablet plate normally being closer thereto than are the ends of the pin or pins.

22. A medicinal tablet-making machine, comprising a plate provided with a hole or group of holes, a passageway for forcing tablet material against said plate and into said hole or holes, a second passageway transverse to the first passageway and provided with means for forcing material into said first passageway, and a hopper transverse to said second passageway and discharging thereinto, said means in said second passageway for forcing material into the first passageway being driven by means which includes a friction clutch which slips upon a predetermined back pressure.

23. A medicinal tablet-making machine, comprising a plate provided with a hole or group of holes, means for forcing tablet material toward said plate, said plate being movable relatively to said means to bring the hole or holes into or out of position to receive tablet material from said means, and driving means which operates intermittently to drive said forcing means only when the hole or holes in the plate are in position to receive tablet material, said driving means including a friction clutch which slips upon the occurrence of a predetermined back pressure while said driving means is driving said forcing means.

24. A medicinal tablet-making machine, comprising a tablet plate provided with a hole or group of holes, feeding mechanism which feeds tablet material into said hole or holes, discharging mechanism which discharges the tablet or tablets from said hole or holes, said discharging mechanism comprising a plunger movable transversely to the tablet plate and provided with a pin which extends into each hole in the plate upon the movement of the plunger, and means for reciprocating said plunger to cause the pin or pins thereof to move into or out of said hole or holes a plurality of times at each discharge operation.

In witness whereof, I have hereunto set my hand and seal at Indianapolis, Indiana, this 5th day of March, A. D. one thousand nine hundred and twelve.

LOUIS P. TENCA. [L. S.]

Witnesses:
  MAY LAYDEN,
  G. B. SCHLEY.